United States Patent

[11] 3,566,203

[72] Inventors David Edmund Maguire
Greenville, S.C.;
Charles Michael Peterson, Cedar Rapids, Iowa
[21] Appl. No. 770,352
[22] Filed Oct. 24, 1968
[45] Patented Feb. 23, 1971
[73] Assignee Union Carbide Corporation
New York, N.Y.

[54] CHIP CAPACITOR
17 Claims, 5 Drawing Figs.

[52] U.S. Cl. .......... 317/230, 317/101, 29/628
[51] Int. Cl. .......... H01g 9/06
[50] Field of Search .......... 317/230, 231, 101, 234, 235

[56] References Cited
UNITED STATES PATENTS

| | | | |
|---|---|---|---|
| 2,903,627 | 9/1959 | McGarvey | 317/101 |
| 3,235,945 | 2/1966 | Hall, Jr. et al. | 317/101A |
| 3,244,939 | 4/1966 | Sandbank | 317/101 |
| 3,374,533 | 3/1968 | Burks et al. | 317/101 |
| 3,375,413 | 3/1968 | Brill | 317/230 |
| 3,471,753 | 10/1969 | Burks et al. | 317/234 |

*Primary Examiner*—James D. Kallam
*Attorneys*—Paul A. Rose, Thomas I. O'Brien and Leo A. Plum

ABSTRACT: A low profile electrolytic capacitor for mounting on a substrate, comprising a base of an insulative material having electrically conductive strips attached to the surface of the base, and a capacitor pellet attached to the base with its cathode portion in electrical contact with one of the strips and with its anode portion in electrical contact with another of the strips through an anode lead. Both of the conductive strips provide bonding areas for making electrical connections of the capacitor to other circuit elements by ultrasonic bonding, parallel gap welding, reflow soldering, etc.

INVENTORS
DAVID E. MAGUIRE
CHARLES M. PETERSON
BY Leo A. Plum, Jr.
ATTORNEY

INVENTORS
DAVID E. MAGUIRE
CHARLES M. PETERSON
BY Leo A. Plum, Jr.
ATTORNEY

CHIP CAPACITOR

BACKGROUND OF THE INVENTION

The present invention relates to electrolytic capacitors, and more particularly to a low profile electrolytic capacitor adapted for mounting on a substrate and connected to other circuit elements.

The electrolytic capacitor art has developed rapidly with the advances in transistor circuitry involving the use of relatively low voltages and miniaturization in the volume of electronic gear. A high capacitance per unit area has been provided by the use of anodizing processes to obtain dielectric films which are thinner than those made by other techniques. Also, the development of a porous plug geometry for the capacitor permits high unit areas to be packed into very small volumes. A further advance has been the use of a solid electrolyte or counterelectrode which permits hermetic sealing and insures a low possibility of leakage of chemicals.

In general, a solid electrolytic capacitor comprises a porous anode body, commonly referred to as a pellet, formed of compressed adherent particles of an anodizable or film-forming metal, a dielectric film produced by anodization on the exposed surfaces of the particles, a layer of a semiconductive oxide on the dielectric film, and an electrically conductive covering cathode layer on the layer of semiconductive oxide. The porous electrode body is usually produced by compressing and sintering particles of a film-forming metal, for example, tantalum, aluminum, tungsten, columbium, hafnium, titanium and zirconium until the particles are bonded into a rigid porous body. After sintering the particles together, the porous body so formed is immersed in an electrolytic bath and anodized to produce a dielectric or anodic film which forms a barrier over the entire surface of the porous body. When the anodic film is formed, the filmed electrode is removed from the electrolyte and impregnated with a semiconductive material which is pyrolytically or chemically convertible to a semiconductive oxide, such as manganese oxide, lead oxide, or nickel oxide, in intimate contact with the anodic film. Following impregnation, the electrode is subjected again to the application of voltage in an electrolyte bath to heal and eliminate imperfections in the barrier film. The electrode can, if desired, be further impregnated with the semiconductive oxide and reformed, and then a conducting deposit is formed over the semiconductive layer by impregnating or coating the electrode with a conductive dispersion, such as graphite in water. Next, the water is driven off and the resulting carbon coated outer surface of the electrode is then provided with a metallic coating which forms the cathode. Leads are connected to the external metallic cathode coating and to the porous anode body completing the electrical connections to the capacitor.

In one prior art chip capacitor, a tantalum pellet is coated on its outer surface with a conductive metal, such as by solder-dipping, which forms the cathode. An anode lead wire extends from the pellet body. Electrical connections to the chip capacitor are made only after the chip is mounted on a printed circuit board or other suitable substrate by soldering. This solder-coated chip, of course, is practical only in instances where a printed circuit board is used having a bonding area for soldering the chip thereto. A major difficulty associated with the use of such chip is that inadequate support is provided for the fragile anode wire. In the case where this chip capacitor is to be mounted on a substrate for connection to integrated circuit chips and other circuit elements, it has been found that such chip capacitor is not often compatible with the conventional integrated circuit chip and hybrid circuit bonding techniques, such as ultrasonic bonding and parallel gap welding.

In another prior art chip capacitor, a metal tab is connected to the anode lead wire, and also, another metal tab is provided on the top surface of the chip for making external connections to the cathode.

In both of the prior art chip devices described above, it is difficult to make the anode and cathode terminals, or tabs, parallel with the substrate and with each other, as is desirable for the conventional bonding techniques. Also, the cathode tab on top of the capacitor chip presents an uneven, and hence, poor bonding surface. In addition, in the prior art chip devices, the location of the cathode terminal in a different plane, generally above the plane of the anode terminal, further complicates the bonding operation. Another problem is presented by the anode wire. Generally, solid electrolytic capacitors are made with the metal employed as the anode lead wire being the same as the film-forming metal used for the body. These film-forming metals, such as tantalum, are fragile and hence extreme care must be exercised during bonding or handling so as not to rupture the anodic film and cause leakage.

OBJECTS

It is an object of this invention to provide a low profile electrolytic capacitor which is compatible with existing integrated circuit chips and hybrid circuits in mounting on a substrate. It is another object of this invention to provide a low profile electrolytic capacitor which is compatible with existing integrated circuit chips and hybrid circuits in bonding techniques, such as ultrasonic bonding and parallel gap welding of wires from other circuit elements, or reflow soldering. It is still another object of this invention to provide a low profile electrolytic capacitor having firm electrode terminals for bonding, and having no loose terminal leads.

SUMMARY OF INVENTION

These and other objects, which will become apparent from the detailed disclosure and claims to follow, are achieved by the present invention which provides a low profile electrolytic capacitor for mounting on a substrate, comprising:

a. a base of an insulative material having at least two separate electrically conductive strips attached to the surface of said base so as to lie parallel to the substrate, and b. at least one capacitor pellet composed of a porous anode body of a sintered film-forming metal, a dielectric film produced by anodizing said porous body, an electrolyte of a semiconductive oxide coated on said dielectric metal film, an electrically conductive metal cathode coating disposed about said electrolyte, and an electrically conductive anode lead extending from the anode portion of said body, wherein said capacitor pellet is firmly attached to said base and arranged so that said cathode coating is in electrical contact with one of said conductive strips, said anode lead is in electrical contact with another of said conductive strips, and both of said conductive strips provide bonding areas for making electrical connections of the capacitor to other circuit elements by ultrasonic bonding, parallel gap welding, or reflow soldering.

It is to be understood that as used herein, the term "chip capacitor" is intended to mean an unencapsulated or encapsulated electronic package configuration without the conventional lead wires and designed to be adhered directly to a printed circuit board or other suitable substrate. It is also to be understood that as used herein, the term "pellet" is intended to mean a solid electrolytic capacitor comprising a body of a sintered film-forming metal as the anode, an oxide film of such metal produced by anodization as the dielectric and an electrically conductive counterelectrode.

THE DRAWINGS

Figure 1:
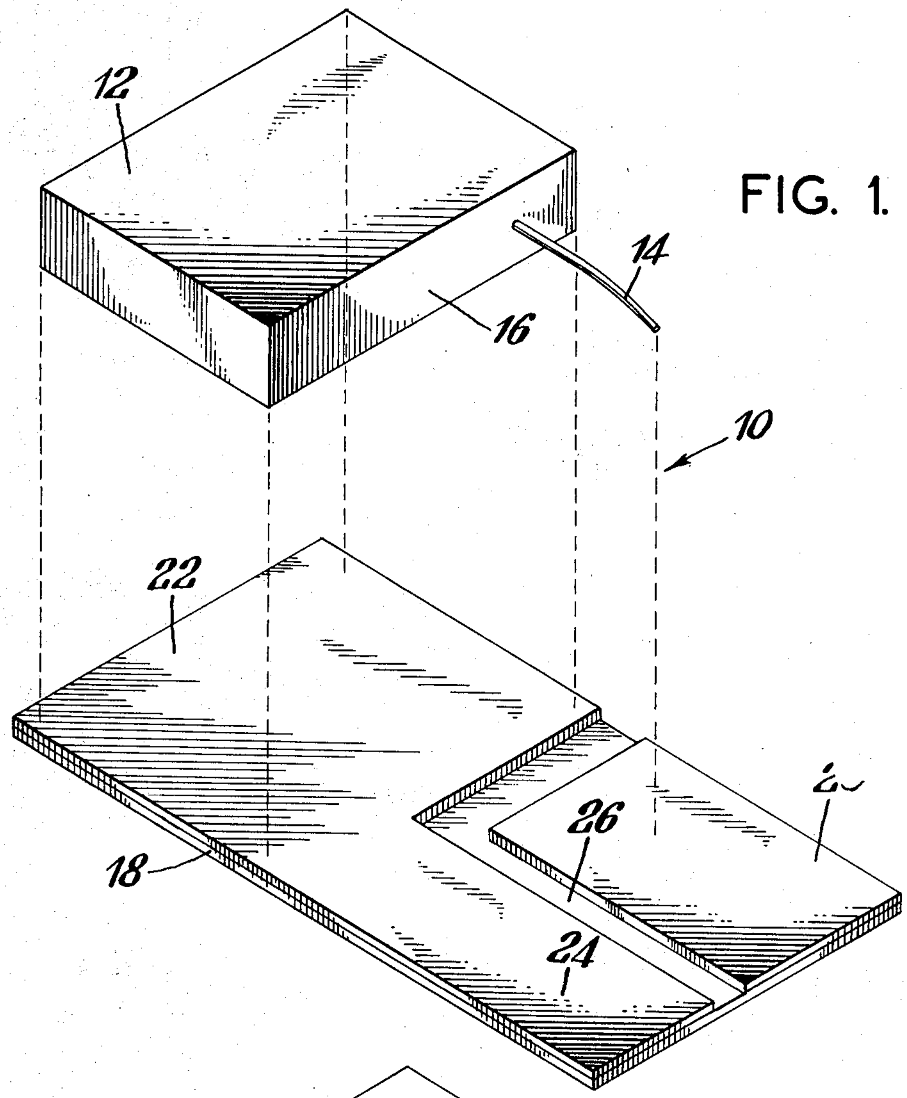
FIG. 1 is a perspective view of the electrolytic capacitor illustrative of the invention, with the pellet shown broken away from the base of insulative material, prior to assembly.
Figure 2:
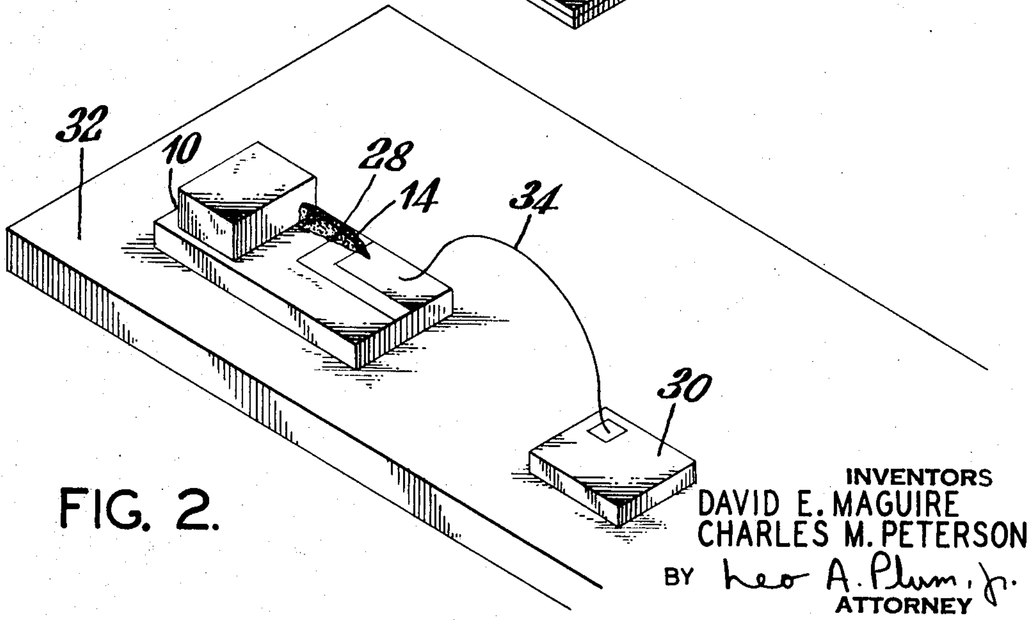
FIG. 2 is a perspective view of the electrolytic capacitor of FIG. 1 shown mounted on a substrate and connected in electrical circuit to an integrated circuit chip containing one or more active circuit elements.

Referring to FIGS. 1 and 2, the electrolytic capacitor 10 comprises a capacitor pellet 12 having an anode lead 14 extending from a side 16 of the pellet 12, and a base 18 of an insulative material. The outer surface of pellet 12 is a coating of metal, such as solder, which forms the cathode. Pellet 12 forms a rectangular shape having a low profile when lying on its broad flat side. It is to be noted that the pellet may have other shapes, such as a disc form. The pellet may be made with overall size dimensions in the order of 0.110 inch long by 0.050 inch wide by 0.025 inch thick, including the anode lead extension. However, the size may vary with specific design requirements. The base 18 is provided with two electrically conductive metal strips 20 and 22 joined to the surface of said base 18 and physically and electrically separated from each other by a space 26. While metal strip 20 is shown having a rectangular shape, and metal strip 22 a general L-shape, such strips may take other suitable shapes. The metal strips 20 and 22, respectively, complete the positive and negative terminations for the anode and the cathode, respectively, by soldering or bonding the pellet 12 to strip 22, and the anode lead 14 to strip 20. After the anode lead 14 and the pellet 12 are soldered to the strips 20 and 22, an epoxy or other insulating material 28 may, if desired, be spread onto and around the anode lead 14. The material 28, when employed, firmly supports the anode lead 14 and protects such lead from damage during handling and bonding. Also, if desired, the pellet 12 can be coated with an insulative material, not shown.

The portion 24 of strip 22, and the strip 20 provide bonding areas for making electrical connections of the capacitor 10 to other circuit elements, such as by connecting the wire 34 to the chip 30 shown in FIG. 2. Strip portions 20 and 24 may be coated, or the underlying metal of such strips may include a metal suitable for joining connections by welding or soldering, as is desired. For parallel gap welding, strips 20 and 24 may be made of a metal having a relatively high resistivity, such as nickel or kovar. For ultrasonic bonding, such strips 20 and 24 may be coated with or made of a suitable ductile metal, such as a gold flash on nickel, or aluminum. The capacitor 10 can be mounted on a substrate 32.

Figure 3:
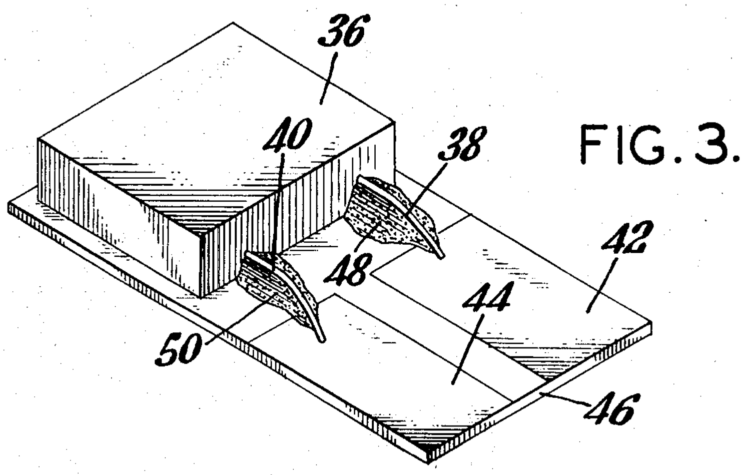
FIG. 3 is a perspective view of an electrolytic capacitor illustrative of another embodiment of the invention.

While the FIGS. 1 and 2 which are provided to illustrate the invention show an electrolytic capacitor having a pellet with one anode lead and a cathode-forming conductive coating on its outside surface, it is to be understood that the pellet may have both an anode lead and a cathode lead, such as is shown in FIG. 3. Also, the metal cathode coating can be covered by a further layer 36 of an insulative material which forms the outside surface of the pellet. In this embodiment, both the anode lead 38 and the cathode lead 40 extending from the pellet are joined to rectangular shaped terminal strips 42 and 44, respectively, located on a base 46 of an insulative material. Also, the pellet is attached to the base 46 by a suitable glue, and a protective epoxy or other insulating material may be spread, at 48 and 50, onto and around the leads 38 and 40, respectively. Terminal strips 42 and 44 are made of suitable materials for making circuit connections by bonding.

Figures 4, 5, 6:
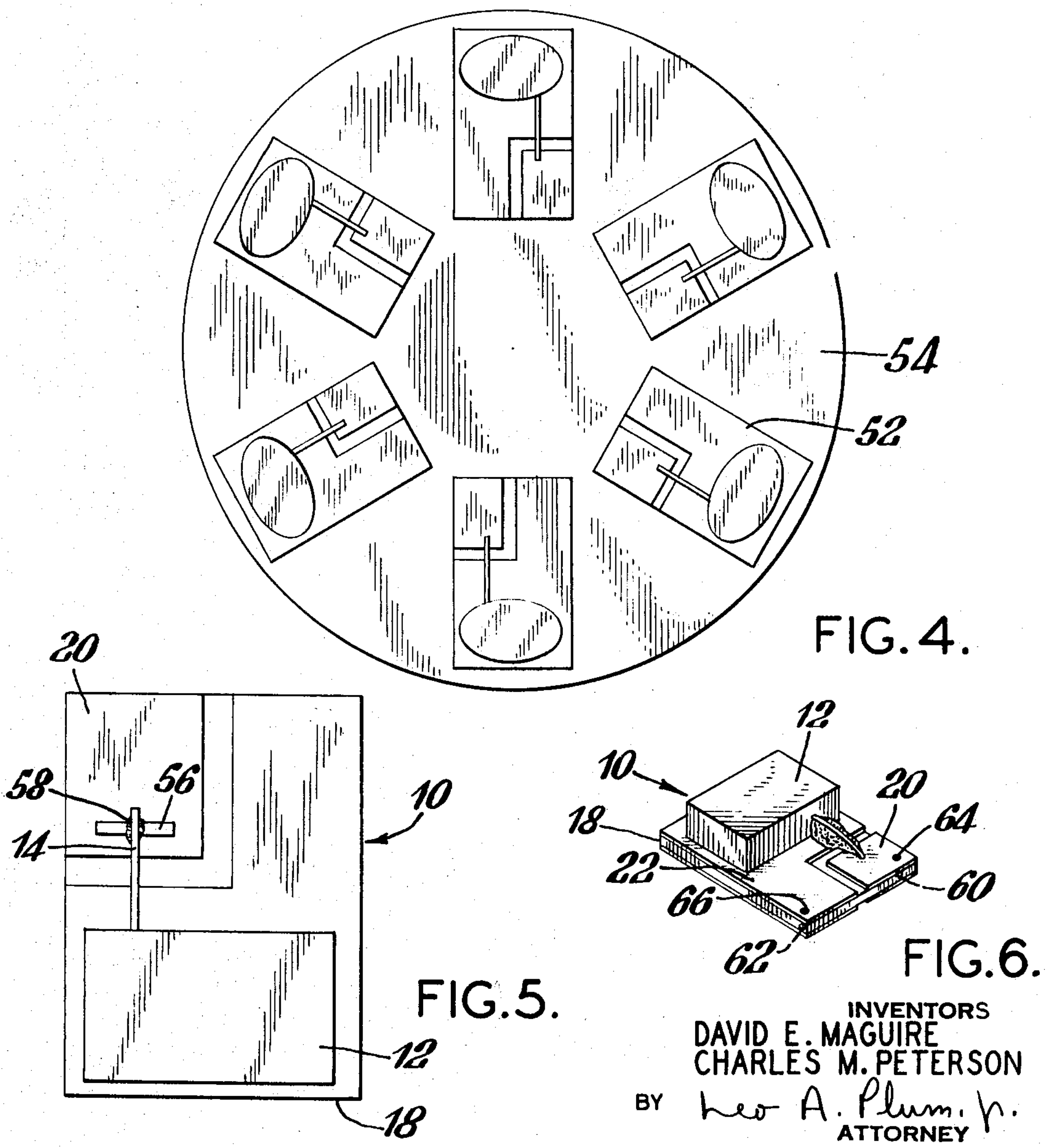
FIG. 4 is a top plan view illustrating an embodiment of the invention wherein a plurality of electrolytic capacitors are mounted on a substrate for connection to each other and to other circuit elements.
FIG. 5 is a top plan view illustrating an embodiment of the invention wherein a metal crosspiece is welded to the anode lead.
FIG. 6 is a perspective view of an electrolytic capacitor illustrative of a further embodiment of the invention wherein a second set of electrically conductive metal strips are joined to the bottom surface of the base of insulative material.

Referring to FIG. 4, there is shown a plurality of electrolytic capacitors 52 mounted on a substrate 54 illustrating one of the many possible capacitor arrangements according to the present invention. The capacitor units 52 may be connected in a circuit and the completed circuit encapsulated in a "can".

FIG. 5 shows still another embodiment of the invention illustrating a modification of the terminal lead 14. As noted previously, the anode lead 14 is usually formed of the identical film forming metal used in the porous pellet body 12. Tantalum is often preferred because a tantalum pellet provides a capacitor having a large surface area, consequently permitting a very high charge per volume. Tantalum and other film-forming metals cannot be soldered readily, since the oxide film on such metals must be first broken down or reduced before the solder is effective. However, this problem is overcome by welding a solderable metal, such as a nickel cross bar 56, to the tantalum lead 14, at point 58, preferably oriented so that it forms a T-shape with lead 14. The nickel cross bar 56 may then be soldered to the metal terminal strip 20 thereby completing the electrical connection of the anode 14 to the terminal strip 20. Another advantage provided by the nickel cross bar 56 is that the T-formation enables a strong solder joint.

Referring to FIG. 6, there is shown a modification of the electrolytic capacitor 10 of the invention wherein the capacitor pellet 12 is mounted on an insulative base 18 having, in addition to the electrically conductive metal strips 20 and 22, respectively, two identical metal strips 60 and 62, respectively, joined to the bottom surface of base 18. Electrical connections between respective top and bottom metal strips 20 and 60, and 22 and 62 can be made by interconnecting metal pins or rivets 64 and 66, respectively, extending through base 18, or by any other suitable manner, such as by folding a single piece of overlapping metal foil, not show, around the edge of base 18 to form both the top and bottom strips 20 and 60, and similarly folding another piece of foil, not shown, to form top and bottom strips 22 and 62. The materials used for the second set of metal strips 60 and 62 can be chosen to permit bonding such strips, and consequently the capacitor 10, to conductive strips, not shown, located below on a printed circuit board or other substrate by reflow soldering or by ultrasonic or thermal-compression bonding.

We claim:

1. A low profile electrolytic capacitor suitable for mounting on a substrate, comprising: a base of an insulative material having at least two separate electrically conductive strips attached to the surface of said base and lying substantially parallel thereon, an at least one capacitor pellet composed of a porous anode body of a sintered film-forming metal, an oxide dielectric film formed on the surfaces of said porous body, a semiconductive oxide electrolyte layer on said dielectric film, an electrically conductive cathode coating disposed over said electrolyte, and an electrically conductive anode lead extending from the porous anode body and separated from said cathode coating, said capacitor pellet being attached to said base and said cathode coating being in electrical contact with one of said conductive strips, said anode lead being in electrical contact with another of said conductive strips, and said conductive strips having areas for making electrical connections of the capacitor to other circuit elements.

2. The capacitor of claim 1, wherein said capacitor pellet is composed of a porous anode body of one of the metals tantalum, aluminum, tungsten, columbium, hafnium, titanium, or zirconium.

3. A The capacitor of claim 1, wherein said electrolyte is one of the oxides of manganese, lead or nickel.

4. The capacitor of claim 1, wherein said electrically conductive strips on the base comprise weldable metals.

5. The capacitor of claim 1, wherein said electrically conductive strips are electrically connected to a second set of conductive strips located on the underside of the base, said second set of strips comprising metals suitable for bonding with other circuit strips.

6. The capacitor of claim 1, wherein said electrically conductive strips on the base comprise a ductile metal for ultrasonic bonding.

7. The capacitor of claim 1, wherein said electrically conductive strips on said base include at least one strip having a rectangular shape and another strip having a general L-shape, and one of the arms of the L-shaped strip is metallurgically bonded to the pellet.

8. The capacitor of claim 1, wherein said electrically conductive strips on said base include at least two strips having a rectangular shape.

9. Rectangular capacitor of claim 1, wherein said pellet has a rectangular shape.

10. The capacitor of claim 1, wherein the outer surface of said pellet comprises a coating of a metal which forms the cathode connection.

11. The capacitor as claimed in claim 10, wherein said pellet is metallurgically bonded to a portion of one of the electrically conductive strips for a cathode terminal.

12. The capacitor of claim 1, wherein a protective insulating material is spread onto and around the anode lead firmly supporting said lead on the base and preventing its electrical contact with the conductive strip thereon connected to the capacitor cathode coating.

13. The capacitor of claim 1, wherein a cathode lead electrically connects the cathode of the capacitor with one of the conductive strips on the base.

14. The capacitor of claim 1, wherein the conductive cathode coating of said pellet is covered by an outer layer of an insulative material encapsulating said pellet.

15. The capacitor of claim 1, wherein a solderable metal bar is welded to the anode lead adjacent the end thereof.

16. The capacitor of claim 15, wherein the solderable metal bar is welded to the anode lead in a crosswise position forming a T-configuration with said lead.

17. A mounted solid electrolytic capacitor comprising: at least a portion of a base of an insulative material having at least two separated electrically conductive strips attached thereto as part of a circuit structure and lying substantially parallel thereon; a solid electrolytic capacitor pellet comprising a porous anode body of a sintered film-forming metal, an oxide dielectric film formed on the surfaces of said porous body, a semiconductive oxide electrolyte layer on said dielectric film, an electrically conductive cathode coating disposed over said electrolyte, an electrically conductive anode lead extending from the porous anode body and separated from said cathode coating, and a solderable metal bar welded to the anode lead in a crosswise position forming a T-configuration with solid lead; said capacitor pellet being attached to said base and said cathode coating being soldered to and in electrical contact with one of said conductive strips, said solderable metal bar being soldered to and in electrical contact with another of said conductive strips, and said conductive strips extending from said contacts to the capacitor for making electrical connections of the capacitor to other circuit elements.